United States Patent
Matsunoshita

(10) Patent No.: US 6,912,069 B1
(45) Date of Patent: Jun. 28, 2005

(54) IMAGE PROCESSING APPARATUS

(75) Inventor: Junichi Matsunoshita, Ebina (JP)

(73) Assignee: Fuji Xerox Co., Ltd., Tokyo (JP)

(*) Notice: Subject to any disclaimer, the term of this patent is extended or adjusted under 35 U.S.C. 154(b) by 806 days.

(21) Appl. No.: 09/650,669

(22) Filed: Aug. 30, 2000

(30) Foreign Application Priority Data

Oct. 29, 1999 (JP) .......................................... 11-309149

(51) Int. Cl.$^7$ ................................................ H04N 1/40
(52) U.S. Cl. ........................................ 358/3.28; 358/2.1
(58) Field of Search ........................ 358/1.9, 2.1, 3.28, 358/448

(56) References Cited

U.S. PATENT DOCUMENTS 6,081,345 A * 6/2000 Curry .......................... 358/3.28
6,092,732 A * 7/2000 Curry .......................... 358/3.28

FOREIGN PATENT DOCUMENTS

| JP | 4-233677 A | 8/1992 |
| JP | 6-62217 A | 3/1994 |
| JP | 6-113107 A | 4/1994 |
| JP | 9-509795 A | 9/1997 |
| JP | 10-51650 A | 2/1998 |
| JP | 11-205577 A | 7/1999 |

* cited by examiner

Primary Examiner—Thomas D Lee
Assistant Examiner—Stephen Brinich
(74) Attorney, Agent, or Firm—Morgan Lewis & Bockius LLP

(57) ABSTRACT

Additional data is embedded in a printed image in a way that makes the additional data unrecognizable to eyes and recognizable without fail by an image input apparatus. An image processing apparatus of the present invention has: an average calculation unit as a density value detection part that detects the density value of a predetermined color component of image data representing a nearby image in the vicinity of an image to which additional data is to be added; a pattern selection unit that decides a pattern which is larger in area at the larger density value detected by the average calculation unit and has a shape corresponding to the value of the additional data to be added to the image; and an addition processing unit that superimposes the pattern decided by the pattern selection unit on image data representing the image.

24 Claims, 15 Drawing Sheets

| AVERAGE AVE | ADDITIONAL DATA BIT | PATTERN SELECTED |
|---|---|---|
| AVE ≦ TH1 | 0 | S00 |
|  | 1 | S01 |
| TH1 < AVE ≦ TH2 | 0 | S10 |
|  | 1 | S11 |
| TH2 < AVE ≦ TH3 | 0 | S20 |
|  | 1 | S21 |
| TH3 < AVE | 0 | S30 |
|  | 1 | S31 |

| MAXIMUM MAX | ADDITIONAL DATA BIT | PATTERN SELECTED |
|---|---|---|
| MAX ≦ TH1 | 0 | S00' |
|  | 1 | S01' |
| TH1 < MAX ≦ TH2 | 0 | S10' |
|  | 1 | S11' |
| TH2 < MAX ≦ TH3 | 0 | S20' |
|  | 1 | S21' |
| TH3 < MAX | 0 | S30' |
|  | 1 | S31' |

FIG.15

| AVERAGE AVE | ADDITIONAL DATA BIT | PATTERN SELECTED |
|---|---|---|
| AVE ≦ TH1 | 0 | S00 |
|  | 1 | S01 |
| TH1 < AVE ≦ TH2 | 0 | S10 |
|  | 1 | S11 |
| TH2 < AVE ≦ TH3 | 0 | S20 |
|  | 1 | S21 |
| TH3 < AVE | 0 | S30 |
|  | 1 | S31 | ered.

IMAGE PROCESSING APPARATUS

BACKGROUND OF THE INVENTION

1. Field of the Invention

The present invention relates to an image processing apparatus that processes digital image data, and more particularly to an image processing apparatus that embeds additional information in the digital image data in superimposed form.

2. Description of the Prior Art

Techniques are available for embedding additional information in digital image data in superimposed form. Recently, there is an active movement to use the additional data embedding techniques for copyright protection or illegal copy prevention of digital publications such as still image data. Also, there is a movement to use the additional data embedding techniques for the purpose of integrating specific electronic image data with other digital image data related to it, or secret communications.

When the additional data embedding techniques are used for the above purposes, additional data such as a copyright ID, user ID, or any identification data is embedded in image data for distribution so that they are visually inconspicuous. There are two known examples of such additional data embedding techniques. One is the technique (disclosed by Published Japanese Translation of PCT International Publication for Patent Application No. Hei 9-509795) for embedding additional data by superimposing noise signals representing additional data in image data. The other is the technique (Japanese Published Unexamined Patent Application No. Hei 10-51650) for embedding additional data by subjecting image data to Fourier transform and manipulating transform coefficients in a concentric region indicative of identical frequencies on a frequency space.

Since these additional data embedding techniques are primarily used for the purpose of preventing electronic illegal copy and illegal use of electronic image data, the additional data is embedded in the image data so that an image based on the electronic image data is displayed on a display apparatus with no reduction in the image quality. Hence, once the electronic image data has been printed by a printer, it is difficult to read the additional data embedded in the image data from the image formed on paper after printing.

Therefore, even if additional data is embedded in electronic image data, since the additional data cannot be recognized from the printed-out image, the printed-out image may be copied and distributed, with the result that the copyright of the electronic Image data is infringed. To read the additional data from the printed-out image, it is conceivable to embed the additional data in the electronic image data to be distributed, with a higher embedding intensity. However, this approach poses the problem of heavily reducing the image quality of the electronic image data displayed on a display apparatus.

On the other hand, as a conventional technique for embedding additional data in a printed-out image, there is a technique for embedding additional data in a printed image by superimposing patterns having positive and negative amplitudes on the image in yellow ink (Japanese Published Unexamined Patent Application No. Hei 6-113107). However, this technique has the problem that, since no pattern is embedded if all bits have a value of "0" as additional data to be embedded, it is difficult to judge whether additional data is not embedded or additional data with all bits having a value of "0" is embedded.

As another conventional technique for embedding additional data in a printed image, there is a technique for embedding additional data by code patterns with two types of minute slant patterns associated with additional data bits of "0" and "1" so that the code patterns are detected from an image by a scanner (Japanese Publish Unexamined Patent Application No. Hei 4-233677). However, this technique has the problem that, since the code patterns are embedded in black in a white region of the image, the embedded additional data is visible.

Although it is conceivable to embed additional data in a predetermined color component of a color image, it becomes difficult to detect an embedded pattern, depending on a local property (density) of the image. Accordingly, if pattern intensity is increased to enable detection in high-density portions of the image, there might arise the problem that the embedded pattern becomes conspicuous in low-density portions.

SUMMARY OF THE INVENTION

The present invention has been made in view of the above circumstances and provides an image processing apparatus that can embed additional data in an image so that it is visually inconspicuous in a printed-out image and can be detected without fail from scanned image data.

An image processing apparatus of the present invention has: a density value detection part that detects the density value of a predetermined color component of image data representing a nearby image in the vicinity of an image to which additional data is to be added; a pattern decision part that decides a pattern which is larger in area at the higher density value detected by the density value detection part and has a shape corresponding to the value of the additional data to be added to the image; and a pattern superimposing part that superimposes the pattern decided by the pattern decision part on image data representing the image.

In the image processing apparatus of the above configuration, the density value detection part detects the density value of the predetermined color component of the image data, and the pattern decision part receives the density value. The pattern decision part decides a pattern which is larger in area at the higher density value and has a shape corresponding to the value of the additional data to be added to the image. The pattern superimposing part superimposes the pattern decided by the pattern decision part on the image data. Thereby, additional data which changes in pattern area according to the density of the image data, is visually inconspicuous, and can be read without fail during detection can be superimposed in the image data.

In another aspect of the image processing apparatus of the present invention, the density value detection part detects the sum of weighed density values of color components of the image data.

In still another aspect of the image processing apparatus of the above configuration, the density value detection part detects the sum of weighed density values of color components of the image data, and the pattern decision part receives the sum density value. The pattern decision part decides a pattern which is larger in area at the larger sum of the weighed density values and has a shape corresponding to the value of the additional data to be added to the image. The pattern superimposing part superimposes the pattern decided by the pattern decision part on the image data. Thereby, a pattern set can be decided taking account of the conspicuousness of each color component of the image data and additional data that is visually inconspicuous and can be accurately read during detection can be superimposed.

BRIEF DESCRIPTION OF THE DRAWINGS

A preferred embodiment of the present invention will be described in detail based on the followings, wherein:

FIG. 13 illustrates a criterion for judging pattern selection;

FIG. 15 illustrates a criterion for judging pattern selection;

DESCRIPTION OF THE PREFERRED EMBODIMENT

Figure 1:
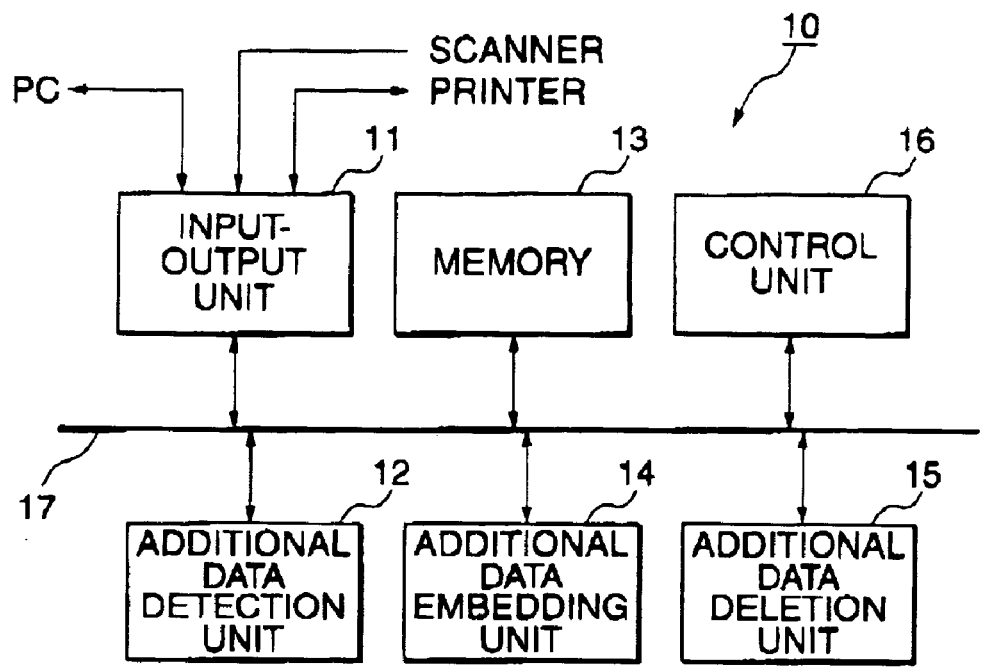
FIG. 1 is a block diagram showing a configuration of an image processing apparatus according to an embodiment of the present invention.

Hereinafter, an embodiment of the present invention Will be described in detail with reference to the accompanying drawings. FIG. 1 is a block diagram showing a configuration of an image processing apparatus according to the embodiment of the present invention.

An image processing apparatus 10 according to the present invention has: an input-output unit 11 that inputs and outputs image data; an additional data detection unit 12 that detects additional data embedded as patterns in the image data; a memory 13 that stores the image data and the additional data; an additional data embedding unit 14 that embeds the additional data as patterns in the image data; an additional data deletion unit 15 that deletes the additional data from the image data; and a control unit 16 that controls the overall apparatus, all of which are connected with each other through a bus line 17.

Additional information represented by the additional data added to the image data may be any information, such as a network address to indicate the location where the image data is stored, and an ID to identify the copyright holder of the image data or image.

Figure 2:
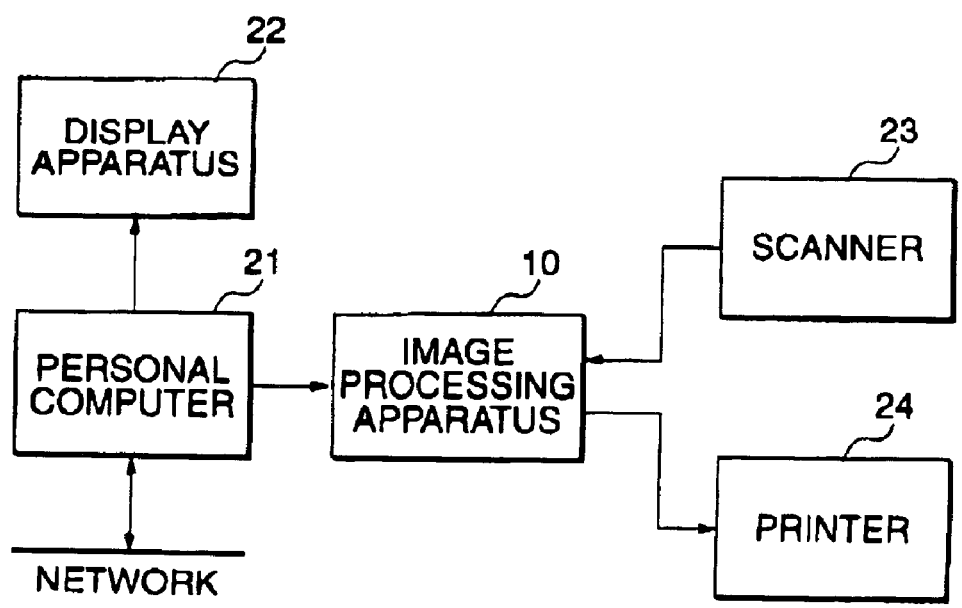
FIG. 2 shows a configuration of the overall system that uses an image processing apparatus of the embodiment.

FIG. 2 shows a configuration of the overall system that uses the image processing apparatus 10. The system has: a personal computer 21 connected to a network; a display apparatus 22 connected to the computer 21; an image processing apparatus 10 to which image data is afforded from the personal computer 21; a scanner 23 that scans documents and affords the image data to the personal computer 21 via the image processing apparatus 10; and a printer 24 that prints image data outputted from the image processing apparatus 10.

In the system of the above configuration, a user receives image data via the network, stores it inside the personal computer 21, displays it on the display apparatus 22, and if necessary upon taking a look at the displayed image, sends it to the printer 24 via the image processing apparatus 10 for printing on paper. The image processing apparatus 10 embeds additional data in the inputted image data by a method suitable for the printing of the printer 24.

The additional data embedding method suitable for the printing of the printer 24 converts each bit of additional data to a minute slant pattern and embeds the slant pattern data in image data additionally and in superimposed form. By embedding the slant patterns in a way that embeds them only in visually inconspicuous yellow components and roughly places them with some interval, reduction in the quality of an image to be printed can be prevented and the additional data can be easily detected when scanned by the scanner 23.

Next, a description is made of the operation of the image processing apparatus 10 and a concrete configuration of major parts thereof. Image data sent from the personal computer 21 of FIG. 2 is inputted through the input-output unit 11 and is stored in the memory 13. Upon termination of the input of the image data, the control unit 16 directs the additional data embedding unit 14 to embed additional data.

Figure 3:
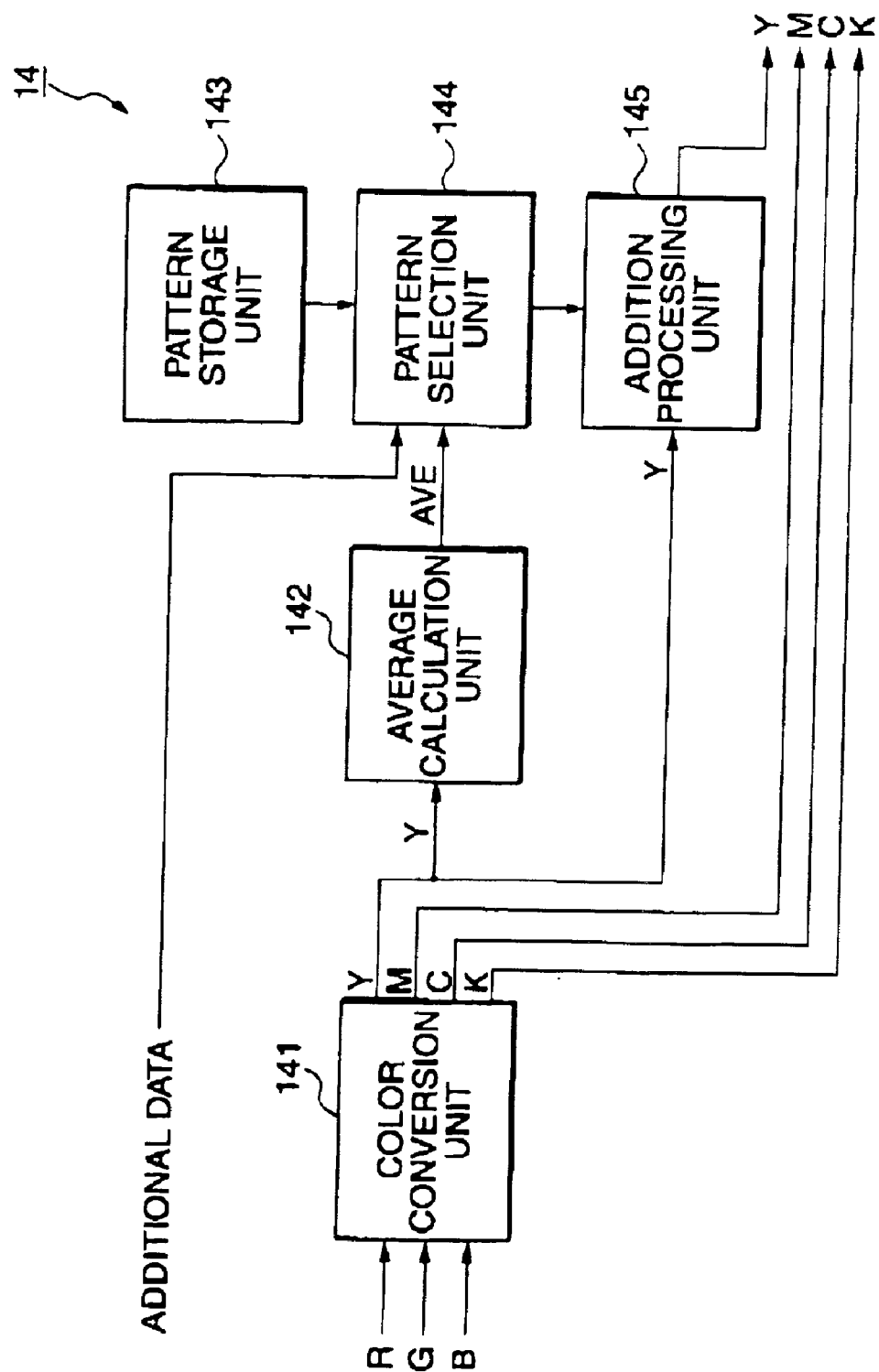
FIG. 3 is a block diagram showing a first concrete example of a configuration of an additional data embedding unit.

FIG. 3 is a block diagram showing a first concrete example of a configuration of the additional data embedding unit 14. The additional data embedding unit 14 according to the first concrete example has: a color conversion unit 141; an average calculation unit 142; a pattern storage unit 143; a pattern selection unit 144; and an addition processing unit 145. Image data read in blocks from the memory 13 (sec FIG. 1) is inputted to the additional data embedding unit 14.

In the additional data embedding unit 14 of the above configuration, the inputted RGB image data is, in the color conversion unit 141, converted from an RGB color space to a YMCK color space of the printer 24 (see FIG. 2). Of the color components, the Y component is inputted to the average calculation unit 142. In the average calculation unit 142, the average of one block of the image data of the Y component is calculated. The calculated average AVE is inputted to the pattern selection unit 144.

Upon receiving the average AVE of one block of the image data of the Y component outputted from the average calculation unit 142, the pattern selection unit 144 selects a pattern having an area corresponding to the average AVE according to an inputted additional data bit, from the pattern storage unit 143.

Figure 4:
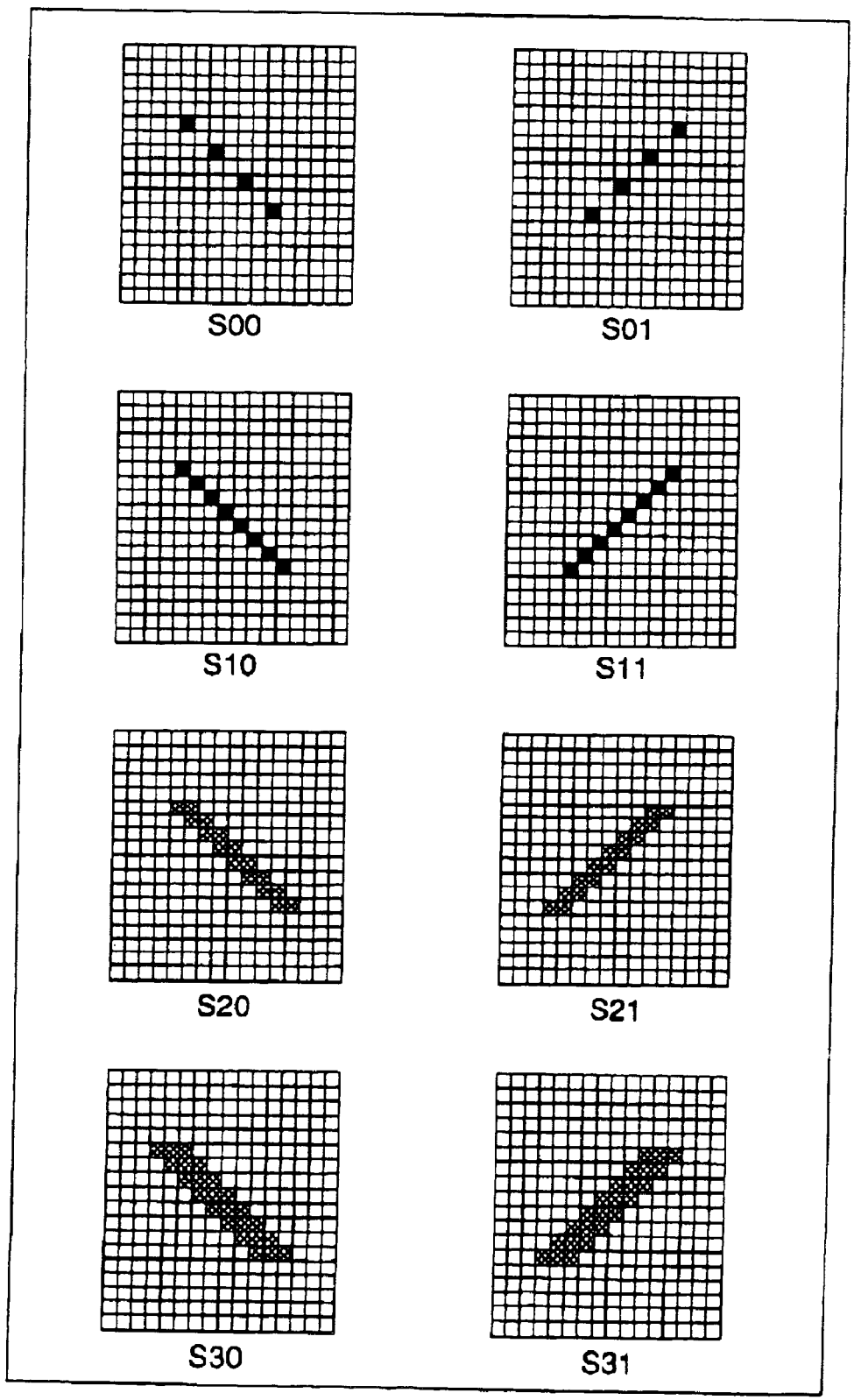
FIG. 4 is a diagram showing an example of patterns stored.

FIG. 4 is a diagram showing an example of patterns stored in the pattern storage unit 143. In this example, eight types of slant patterns, S00, S01, S10, S11, S20, S21, S30, and S31, which differ in area and angle from each other, are used. Of these patterns, the patterns S00, S10, S20, and S30 represent an additional data bit of 0, and S01, S11, S21, and S31 represent an additional data bit of 1. The pattern pairs S00 and S01, S10 and S11, S20 and S21, and S30 and S31 constitute one set each, and a total of four sets, eight patterns, are stored. Although four patterns representing identical additional data bits are slant patterns of an identical direction, they are different from each other in the number of pixels (area) constituting the patterns.

Black portions indicating the patterns in the figure contain a positive coefficient value a, slant portions contain a negative coefficient value b, and white portions contain a coefficient 0. The positive coefficient value a and the negative coefficient value b, which represent the amplitude of the patterns, are set in advance.

The size of the patterns is 16×16, which is equal to the size of a block of image data. In comparison with the block size, portions having positive or negative coefficient values, slantingly placed, are smaller. This is done to make those portions visually inconspicuous.

Figures 5, 6:
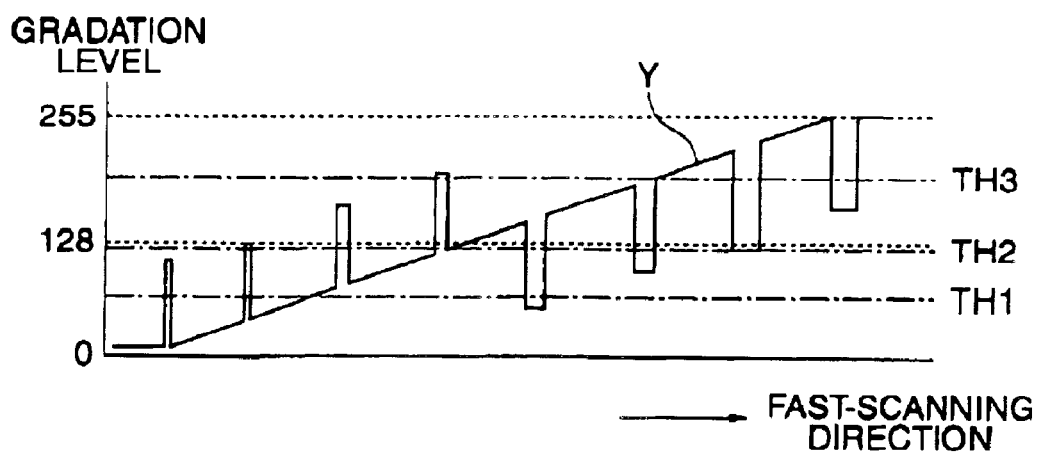
FIG. 5 illustrates a criterion for judging pattern selection.
FIG. 6 is a diagram showing an example of an image waveform when a pattern is embedded in Y component image data.

The judgment as shown in FIG. 5 is used for such a pattern selection in the pattern selection unit 144. TH1, TH2, and TH3 represent threshold values, and there is a relation of TH1<TH2<TH3. One additional data bit is inputted per block.

When the average AVE is equal to or less than the threshold value TH1, a pattern set including the S00 and S01 patterns having positive coefficient values is selected; when the average AVE is greater than the threshold value TH1 and equal to or less than the threshold value TH2, a pattern set including the S10 and S11 patterns having positive coefficient values is selected; when the average AVE is greater than the threshold value TH2 and equal to or less than the threshold value TH3, a pattern set including the S20 and S21 patterns having negative coefficient values is selected; and when the average AVE is greater than the threshold value TH3, a pattern set including the S30 and S31 patterns having negative coefficient values is selected. Moreover, according to the value of inputted additional data bit, one of two patterns contained in a selected pattern set is finally selected.

If the density value of the yellow component is higher, a pattern having more pixels (larger area) to constitute it is selected. This is for the following reason of property. In a region having a low density, the entire region is likely to appear yellow because of the pattern but the embedded pattern is relatively easily detected, while, in a region having a high density, the embedded pattern is not so conspicuous but is relatively difficult to detect. The area of a pattern is enlarged or reduced by changing the width of the pattern without collapsing its shape.

The addition processing unit 145 adds the pattern selected in the pattern selection unit 144 to the Y component of the image data and outputs the result. If the result of the addition is 235 or greater, 255 is outputted, and if less than 0, 0 is outputted. By the addition processing, one bit of additional data is embedded in the image data.

FIG. 6 is a diagram showing an example of an image waveform when a pattern is embedded in an image of which the Y component image data is gradually increasing (yellow gradation). As the gradation level and the gradation level associated with the threshold values TH1, TH2, and TH3 become higher, the waveform becomes wider in the fast scanning direction of the patterns.

In this way, by superimposing a pattern (additional data) having an area different according to the average AVE of one block of the Y component on the image data of the Y component, in an image printed out by the printer 24, even if the density is high, the pattern embedded in the Y component can be detected without fail, while, if the density is low, reduction in the image quality can be prevented by not making the pattern excessively conspicuous.

The image data of the Y component added with the additional data, outputted from the addition processing unit 145, is stored in the memory 13 (see FIG. 1) along with the image data of MCK components outputted from the color conversion unit 141. The above processing is repeated for all blocks until processing of one page terminates, in which time the image data stored in the memory 13 is outputted to the printer 24 (see FIG. 2) for printing on paper.

Next, a description is made of how the image processing apparatus operates when the scanner 23 scans the image printed on paper. First, image data based on the image scanned by the scanner 23 is inputted from the input-output unit 11 and is stored in the memory 13. Upon termination of the storing of the image data in the memory 13, the control unit 16 directs the additional data detection unit 12 to detect additional data.

Figure 7:
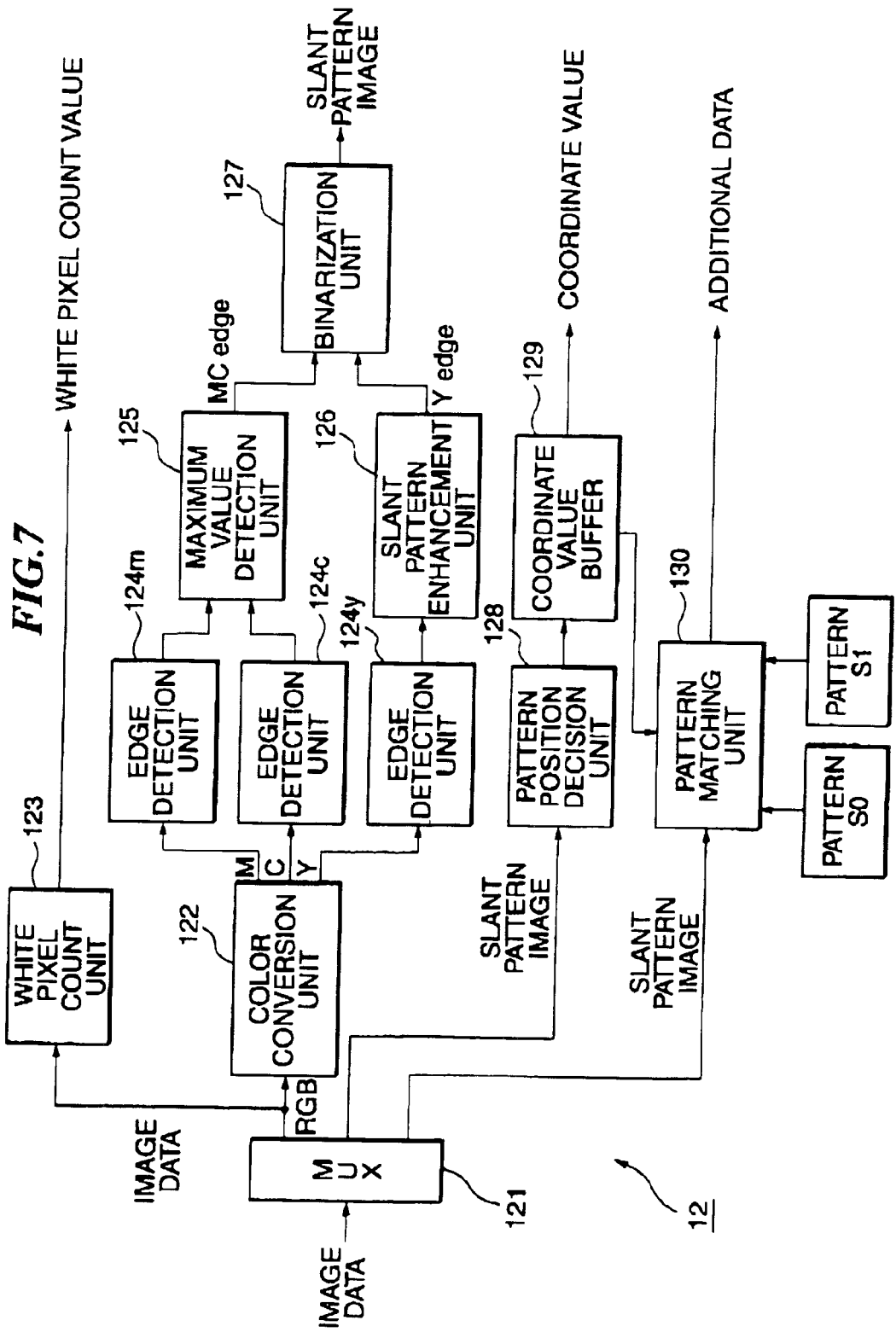
FIG. 7 is a block diagram showing an example of a concrete configuration of an additional data detection unit.

FIG. 7 shows an example of a concrete configuration of the additional data detection unit 12. The additional data detection unit 12 has: a multiplexer (MUX) 121; a color conversion unit 122; a white pixel counting unit 123; edge detection units 124m, 124c, and 124y; a maximum value detection unit 125; a slant pattern enhancement unit 126; a binarization processing unit 127; a pattern position decision unit 128; a coordinate value buffer 129; and a pattern matching unit 130. The image data stored in the memory 13 is inputted to the additional data detection unit 12.

In the additional data detection unit 12 of the above configuration, the inputted image data is inputted to the color conversion unit 122 and the white pixel counting unit 123 via the multiplexer 121. The image data inputted to the color conversion unit 122 is converted from the RGB color space to the YMC color spice in the color conversion unit 122 and is separated to the Y component and the MC components before being outputted.

The Y component is supplied to the edge detection unit 124y for edge detection filtering. Thereafter, enhancement filtering is performed to enhance a slant pattern in the slant pattern enhancement unit 126, and an edge image Yedge is created and supplied to the binarization processing unit 127. On the other hand, the image data of the MC components is in parallel subjected to edge detection filtering by the two edge detection units 124m and 124c and the greater of pixel values is selected by the maximum value detection unit 125, whereby edge image data MCedge is created and supplied to the binarization processing unit 127.

In the binarization processing unit 127, the following binarization processing is performed based on the two inputted pieces Yedge and MCedge of image data and two preset threshold values THa and THb. That is, if the edge image data Yedge is greater than the threshold value THa and the edge image data MCedge is smaller than the threshold value THb, an image value "1", and otherwise an image value "0" is outputted.

The binary image data thus created is slant pattern image data with only slant edges of the Y component extracted. The slant pattern image data is outputted from the additional data detection unit 12 and is temporarily stored in the memory 13. In parallel with the above processing, the white pixel counting unit 123 judges whether each pixel value of the inputted image data is a white pixel or not, by comparing it with a threshold value, counts the number of white pixels, and outputs the count value to the control unit 16.

Next, the slant pattern image data stored in the memory 13 is inputted to the additional data detection unit 12. The slant pattern image data is inputted to the pattern detection unit 128 via the multiplexer 121 to perform pattern position calculation processing as described below.

First, a projection distribution Tx(i) in the fast-scanning direction of inputted binary slant pattern image data P(ij) and a projection distribution Ty(j) in the slow-scanning direction are obtained by the following expressions.

$$Tx(i)=\Sigma i(P(i,j))$$

$$Ty(j)=\Sigma i(P(i,j))$$

Thereafter, by convolutionally adding the obtained projection distributions at a 16-pixel interval, which is the same pixel interval as the block size, convolutional projection distributions Ux(n) and Uy(m) are obtained.

$$Ux(n)=\Sigma k(Tx(n+16*k)), \text{ where } n=1, 2 \ldots 16$$

$$Uy(m)=\Sigma k(Ty(m+16*k)), \text{ where } n=1, 2 \ldots 16$$

The maximum values of the obtained convolutional projection distributions in the fast-scanning direction and slow-scanning direction are respectively the starting coordinates of pattern positions in the fast-scanning direction and slow-scanning direction, and positions 16 pixels apart from the coordinates are pattern position coordinates. Obtained coordinate values are stored in the coordinate value buffer 129 and are at the same time outputted from the additional data detection unit 35 and are stored in a coordinate storage area on the memory 13.

Figure 8B:
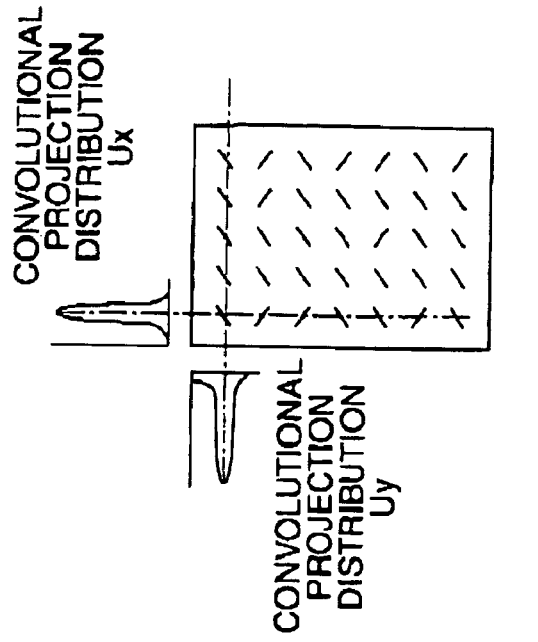
FIGS. 8A to 8C illustrate detection operations in the additional data detection unit.
Figure 8A:
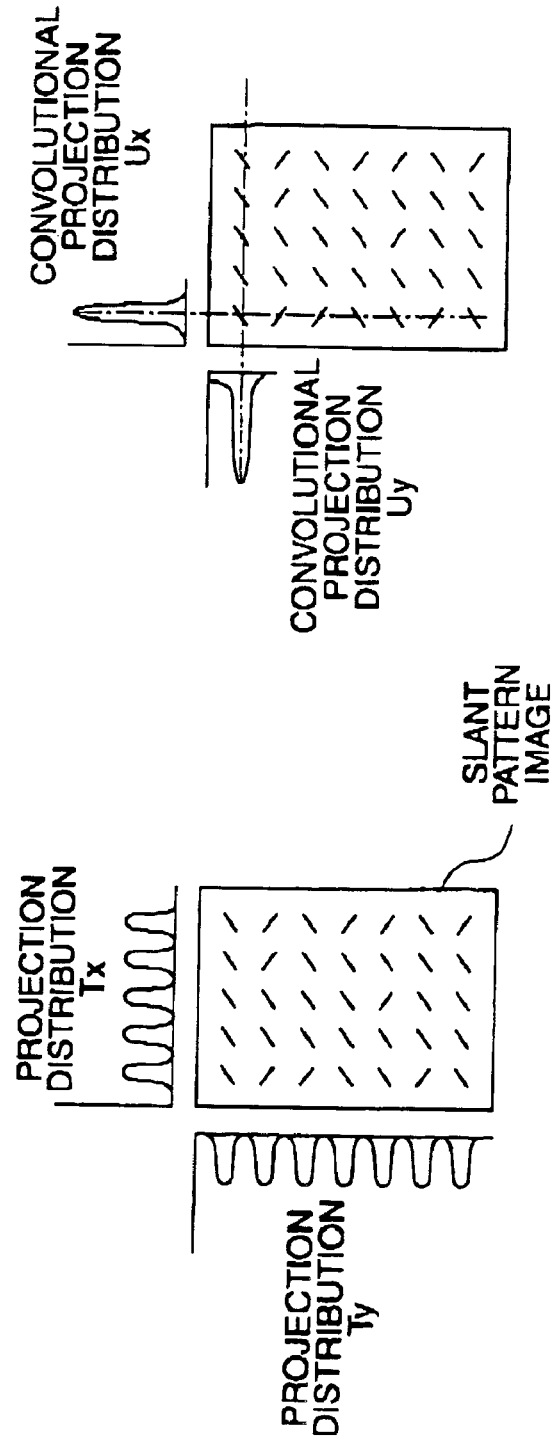
Figure 8C:
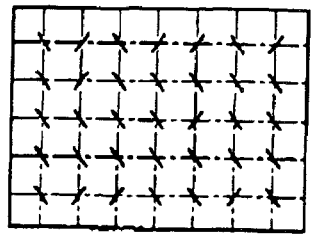

If the image data inputted from the scanner 23 is image data added with additional data, obtained projection distributions are cyclic distributions having crests and troughs continuously repeated at a fixed interval, that is, a 16-pixel interval, as shown in FIG. 8A. The convolutional distributions are in the shape of a mountain, as shown in FIG. 8B, and the maximum values correspond to pattern positions. If the coordinates, as a starting point, are added 16 pixels at a time in the fast-scanning direction and the slow-scanning direction, coordinate values of other patterns are obtained as shown in FIG. 8C.

Thereafter, the slant pattern image data stored in the memory 13 is inputted to the additional data detection unit 12. In obtained pattern position coordinates, additional data is detected by pattern matching processing in the pattern matching unit 130.

The pattern matching unit 130 reads pattern position coordinates from the coordinate value buffer 129 and reads out one block of the slant pattern image data (binary image) B, stored in the memory 13, around the coordinates. Matching values M0 and M1 of two patterns are calculated on the read block of the image data B by the expressions below. FIG. 9 shows patterns S00 and S01 used. A black point in the figure designates a value 1 and a white point designates a value 0.

$$M0=\Sigma ij(AND(B(ij), S0(i,j)))$$

$$M1=\Sigma ij(AND(B(ij), S1(i,j)))$$

The matching values M0 and M1 obtained by the above expressions and the preset threshold value THc are compared, and if the matching value M0 is greater than the matching value M1 and the threshold value TH3, a value "0" is outputted as an additional data bit; otherwise, a value "1" is outputted as an additional data bit. These are stored in an additional date storage area on memory 34. The above pattern matching processing is performed for all pattern position coordinates and then the additional data detection processing terminates.

After the termination of the additional data detection processing by the additional data detection unit 12, the control unit 16 checks the count value of white pixels counted by the additional data detection unit 12. If the number of white pixels is equal to or greater than a preset threshold value, since white background portions occupy a large amount of image data (hereinafter referred to as scanned-in image data) inputted from a scanner 43, judging that yellow slant patterns existing in the white background portions would appear conspicuous when the image is displayed on the display apparatus 22, the control unit 16 directs the additional data deletion unit 15 to delete the additional data, that is, the slant patterns from the scanned-in image data.

On the other hand, if the number of white pixels is less than the preset threshold value, the control unit 16 performs control so as to transfer the image data and additional data stored in the memory 13 from the input-output unit 11 to the personal computer 21.

Figure 10:
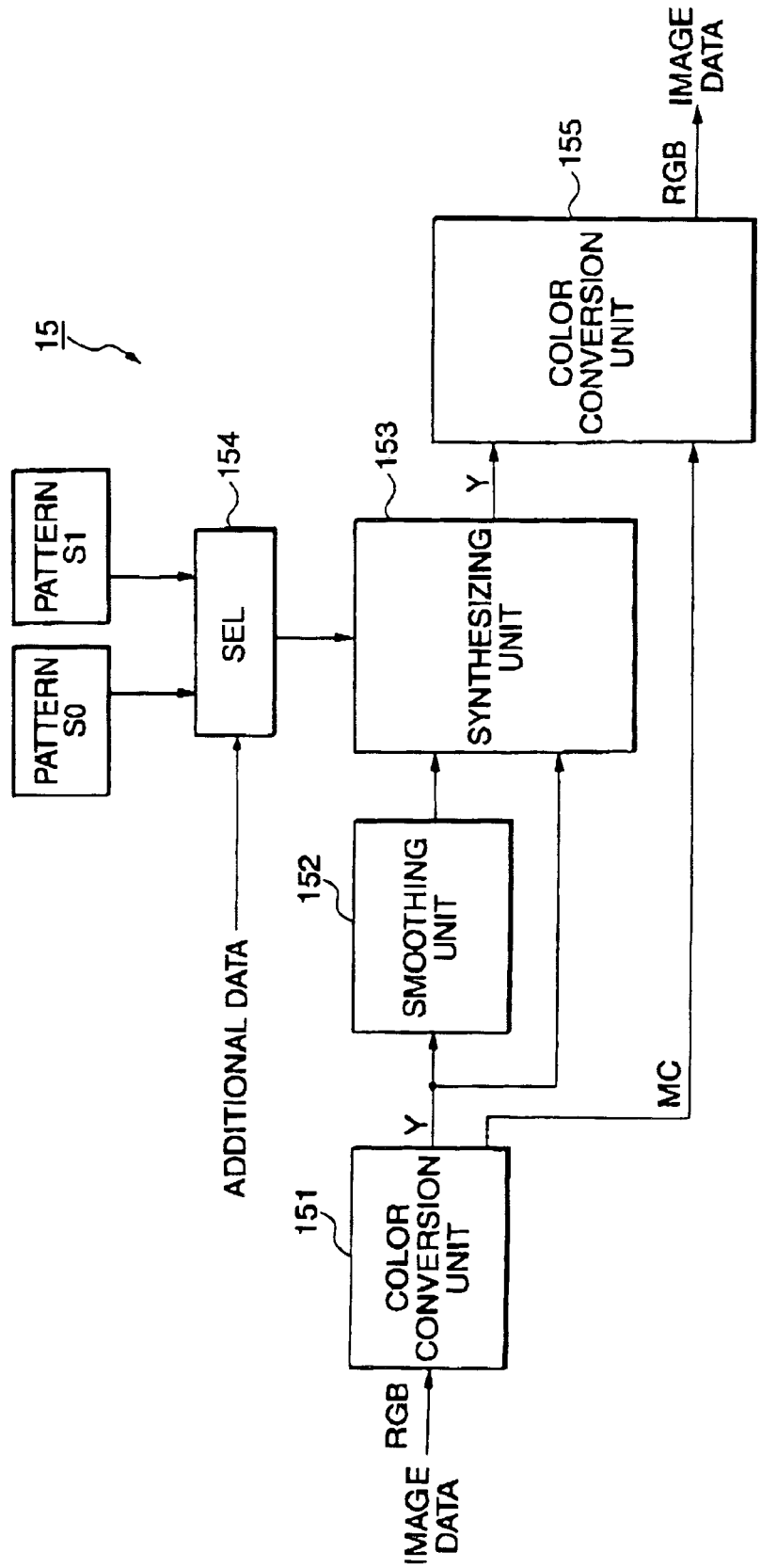
FIG. 10 is a block diagram showing an example of a concrete configuration of an additional data deletion unit.

FIG. 10 shows a concrete configuration of the additional data deletion unit 15. The additional data deletion unit 15 has: a color conversion unit 151; a smoothing unit 152; a synthesizing unit 153; a selector 154; and a color conversion unit 155. The additional data deletion unit 15 reads the previously obtained pattern position coordinates from the coordinate storage area on the memory 13 and reads out one block of the scanned-in image data, stored in the memory 13, around the coordinate value.

In the additional data deletion unit 15 of the above configuration, the read block of the image data is converted from the RGB color space to the YMC color space in the color conversion unit 151 and is separated to the Y component and the MC components. While being directly supplied to the synthesizing unit 153, the Y component is subjected to smoothing filtering in the smoothing unit 152 before being supplied to the synthesizing unit 153.

Figure 9A:
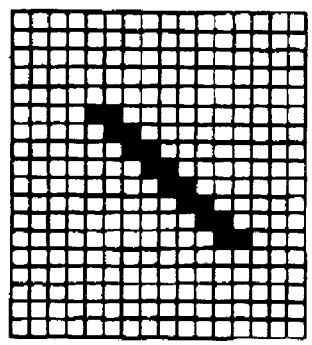
FIGS. 9A and 9B show examples of patterns S00 and S01 used in pattern matching.
Figure 9B:
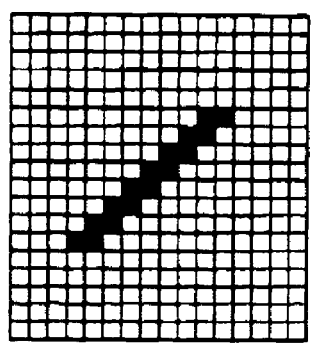

To the synthesizing unit 153 is inputted either of patterns S0 and S1 selected by the selector 154, based on the additional data bit read from the memory 13. The synthesizing unit 153 replaces pixels of the read block of the image data, corresponding to nonzero coefficients within the pattern, by pixels of the image data having been subjected to the smoothing filtering, and outputs the replaced image data. FIGS. 9A and 9B show the patterns S0 and S1, respectively.

Thereafter, the color conversion unit 155 performs color conversion processing again to restore the original image data of the RGB space. The outputted image data is stored in the memory 13. The above processing is repeated for all blocks to delete slant patterns from the scanned-in image data stored in the memory 13.

After the slant pattern deletion processing, the control unit 16 performs control so as to transfer the image data and additional data stored in the memory 13 from the input-output unit 11 to the personal computer 21.

Figure 11:
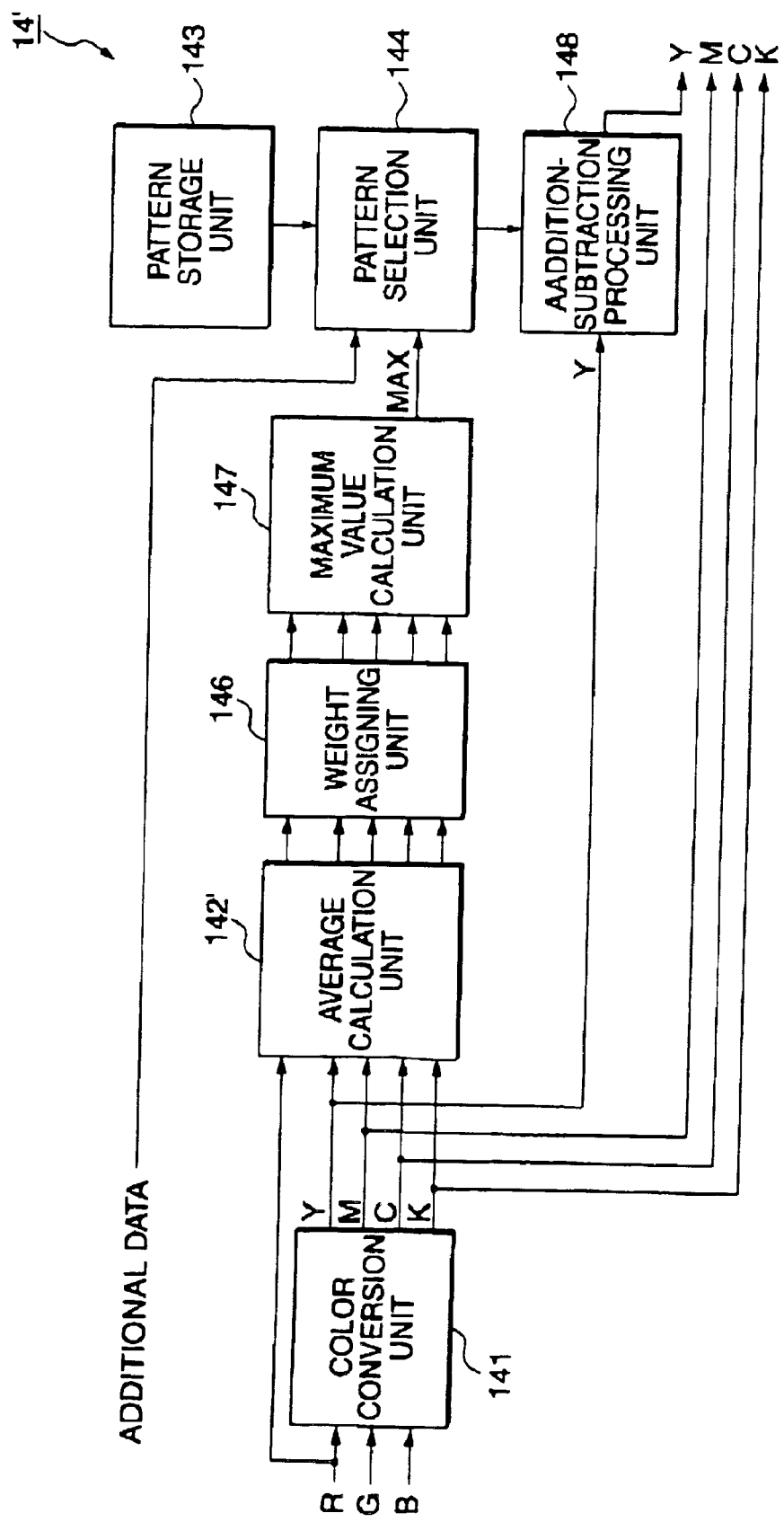
FIG. 11 is a block diagram showing a second concrete example of a configuration of the additional data embedding unit.

Next, FIG. 11 shows a second concrete example of a configuration of the additional data embedding unit. An additional data embedding unit 14' according to the second concrete example has: a color conversion unit 141; an average calculation unit 142'; a weight assigning unit 146; a maximum value calculation unit 147; a pattern storage unit 143; a pattern selection unit 144; and an addition-subtraction processing unit 148. Image data read in blocks from the memory 13 (see FIG. 1) is inputted to the additional data embedding unit 14'.

In the additional data embedding unit 14' of the above configuration, the inputted RGB image data is, in the color conversion unit 141, converted from the RGB color space to the YMCK color space of the printer 24 (see FIG. 2). The image data of the YMCK components and the R component is inputted to the average calculation unit 142' and the average of one block of the image data is calculated for each of the YMCKR color components.

The calculated average of each of the YMCKR color components is inputted to the weight assigning unit 146, where a weight is assigned to the average of each of the color components. For example, the following weight coefficients are used taking account of whether patterns are conspicuous or are easy to detect, depending on the color of an image region where the patterns are to be embedded.

Y component . . . Weight coefficient (1.0)
M component . . . Weight coefficient (1.0)
C component . . . Weight coefficient (0.5)
K component . . . Weight coefficient (1.5)
R component . . . Weight coefficient (1.5)

That is, in high-density regions such as red (R) and black (K) regions, where detection is difficult, greater weight coefficients are assigned so that wider patterns are selected. On the other hand, in cyan regions, since patterns are conspicuous and easy to detect, smaller weight coefficients are assigned so that narrower patterns are selected.

The weighed averages of each color component in the weight assigning unit 146 are inputted to the maximum value calculation unit 147, where the maximum value MAX of the averages (having been assigned weights) of the color components is calculated. The maximum value MAX is inputted to the pattern selection unit 144.

The pattern selection unit 144 receives the maximum value MAX outputted from the maximum value calculation unit 147 and selects a pattern having an area corresponding to the maximum value MAX according to an inputted additional data bit, from the pattern storage unit 143.

Figure 12:
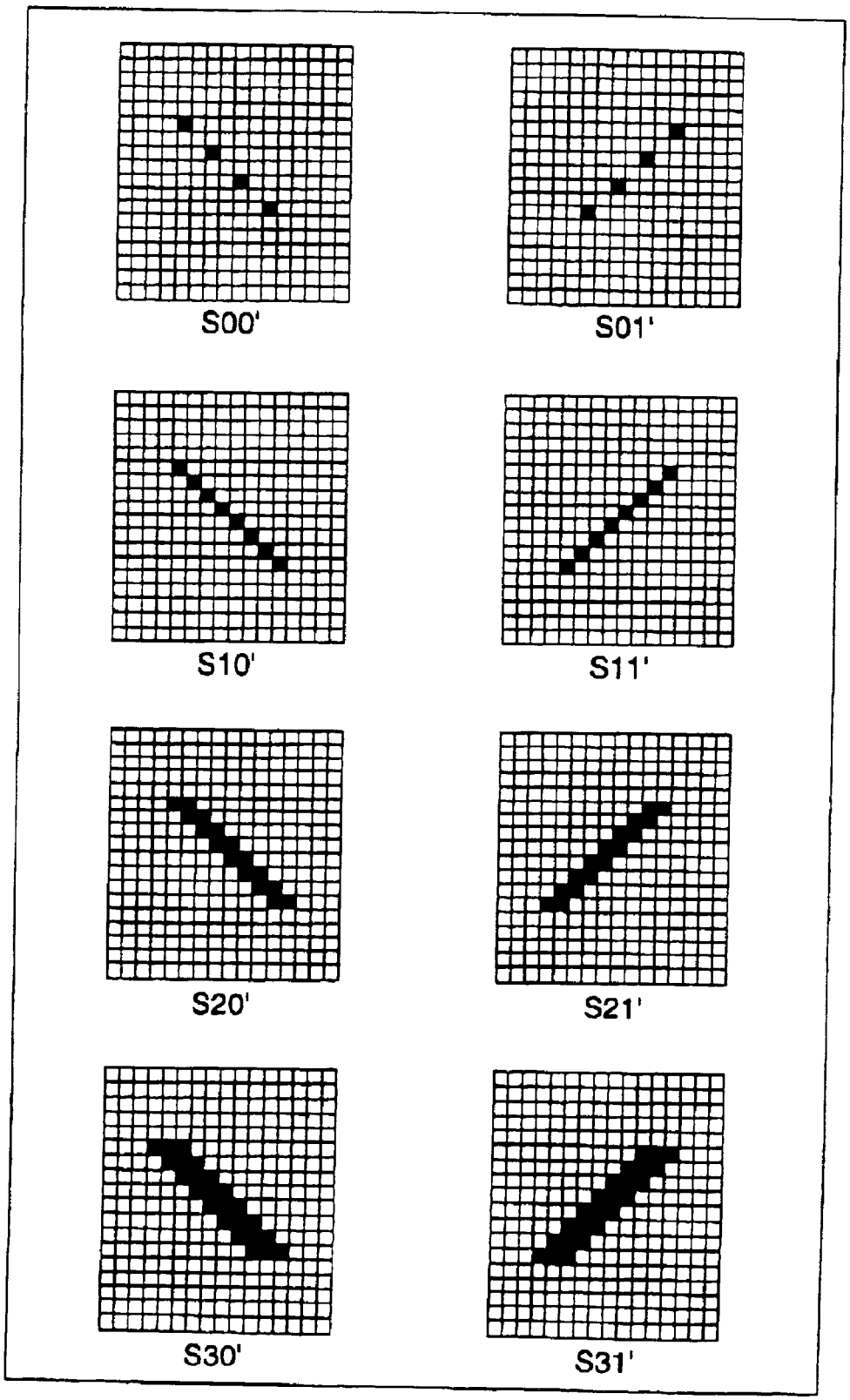
FIG. 12 is a diagram showing an example of patterns stored.

FIG. 12 is a diagram showing an example of patterns stored in the pattern storage unit 143. In this example, eight types of slant patterns, S00', S01', S10', S11', S20', S21', S30', and S31', which differ in area and angle, are used. The black portions indicating the patterns in the figure contain a positive coefficient value a, and the white portions contain a coefficient 0. The positive coefficient value a, which indicates the amplitude of the patterns, is set in advance.

The size of the patterns is 16×16, which is equal to the size of a block of image data. In comparison with the block size, portions having positive or negative coefficient values, slantingly placed, are smaller. This is done to make those portions visually inconspicuous.

The pattern selection unit 144 selects the patterns, using the judgment as shown in FIG. 13. TH1, TH2, and TH3 denote threshold values, and there is a relation of TH1<TH2<TH3. One additional data bit is inputted per block.

When the maximum value MAX of the averages of color components of one block is equal to or less than the threshold value TH1, a pattern set including patterns S00 and S01 is selected; when the maximum value MAX is greater than the threshold value TH1 and equal to or less than the threshold value TH2, a pattern set including patterns S10 and S11 is selected; when the maximum value MAX is greater than the threshold value TH2 and equal to or less than the threshold value TH3, a pattern set including patterns S20 and S21 is selected; and when the maximum value MAX is greater than the threshold value TH3, a pattern set including patterns S30 and S31 is selected. Moreover, according to the value of an inputted additional data bit, either of two patterns contained in a selected pattern set is finally selected.

If the maximum value MAX of the averages of color components is higher, that is, the density value of an area in which a pattern is to be embedded is higher, a pattern having more pixels (larger area) to constitute it is selected. This is for the following reason of property. In a region having a low density, the entire region is likely to appear yellow because of the pattern but the embedded pattern is relatively easily detected, while, in region having a high density, the embedded pattern is not so conspicuous but is relatively difficult to detect. The area of a pattern is enlarged or reduced by changing the width of the pattern without collapsing its shape.

The addition-subtraction processing unit 148 adds or subtracts the additional data based on the pattern selected in the pattern selection unit 144 to or from the Y component of the image data, and outputs the result. That is, if the value of the Y component is less than 128, the pattern coefficient value a is added (positive amplitude), and if equal to or greater than 128, the pattern coefficient value a is subtracted (negative amplitude). No operation is performed for pixels corresponding to white portions. If the result of the adding or subtracting becomes equal to or greater than 255, 255 is outputted, and if less than 0, 0 is outputted.

In this way, by superimposing a pattern (additional data) having a area different according to the maximum value MAX of the averages of one block of the color components on the image data of the Y component, in an image printed out by the printer 24, even if the density is high, the slant edge pattern embedded in the Y component can be detected without fail, while, if the density is low, reduction in the image quality can be prevented by not making the slant pattern excessively conspicuous.

The image data of the Y component added with the additional data, outputted from the addition-subtraction processing unit 148, is stored in the memory 13 (see FIG. 1) along with the image data of MCK components outputted from the color conversion unit 141. The above processing is repeated for all blocks until processing of one page terminates, in which time the image data stored in the memory 13 is outputted to the printer 24 (see FIG. 2) for printing on paper.

Although, in the above second concrete example, a pattern is selected according to the maximum value of the weighed averages of color components, a pattern may be selected according to the sum of weighed density values of color components.

Figure 14:
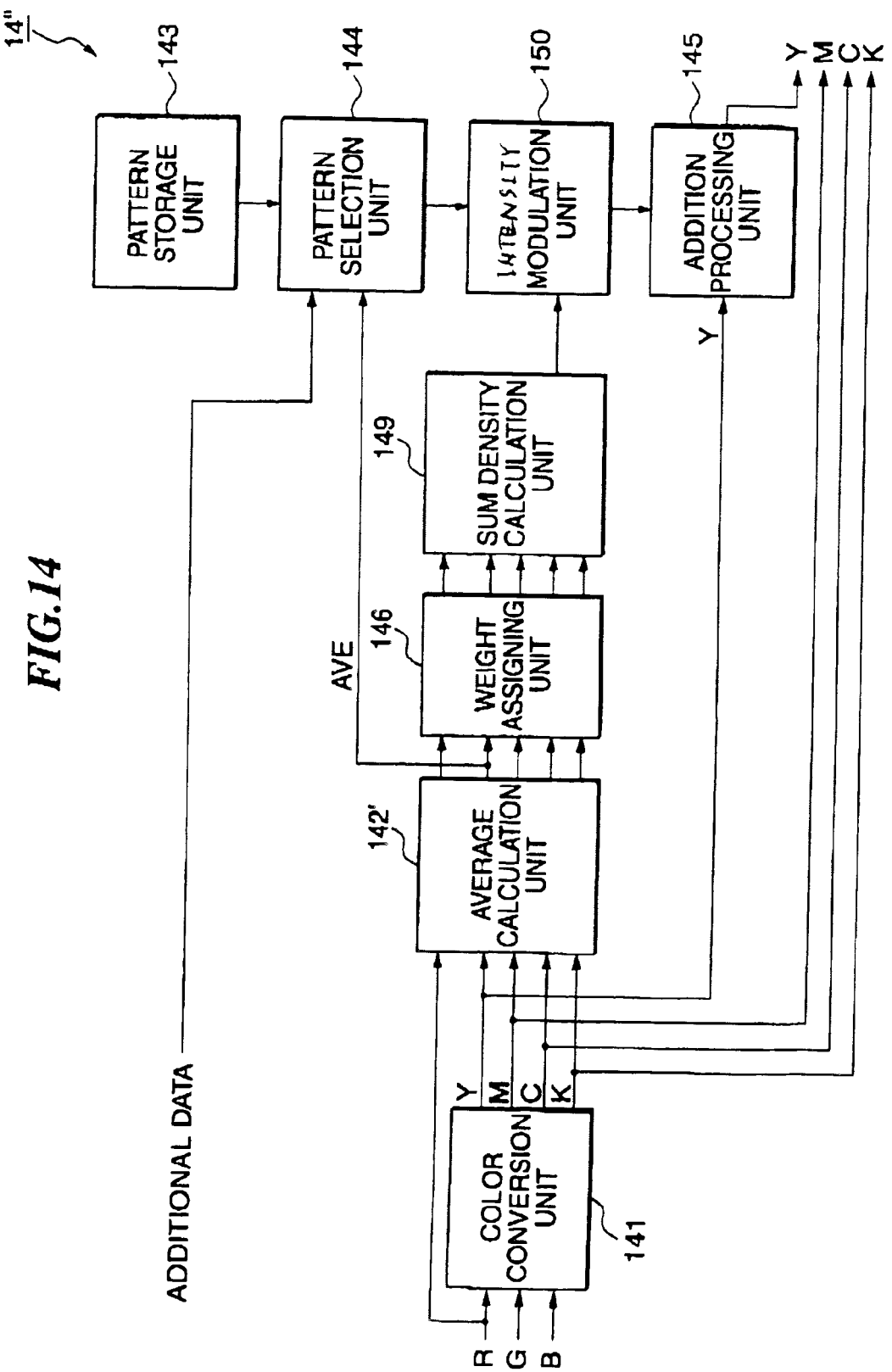
FIG. 14 is a block diagram showing a third concrete example of a configuration of the additional data embedding unit.
Figure 16:
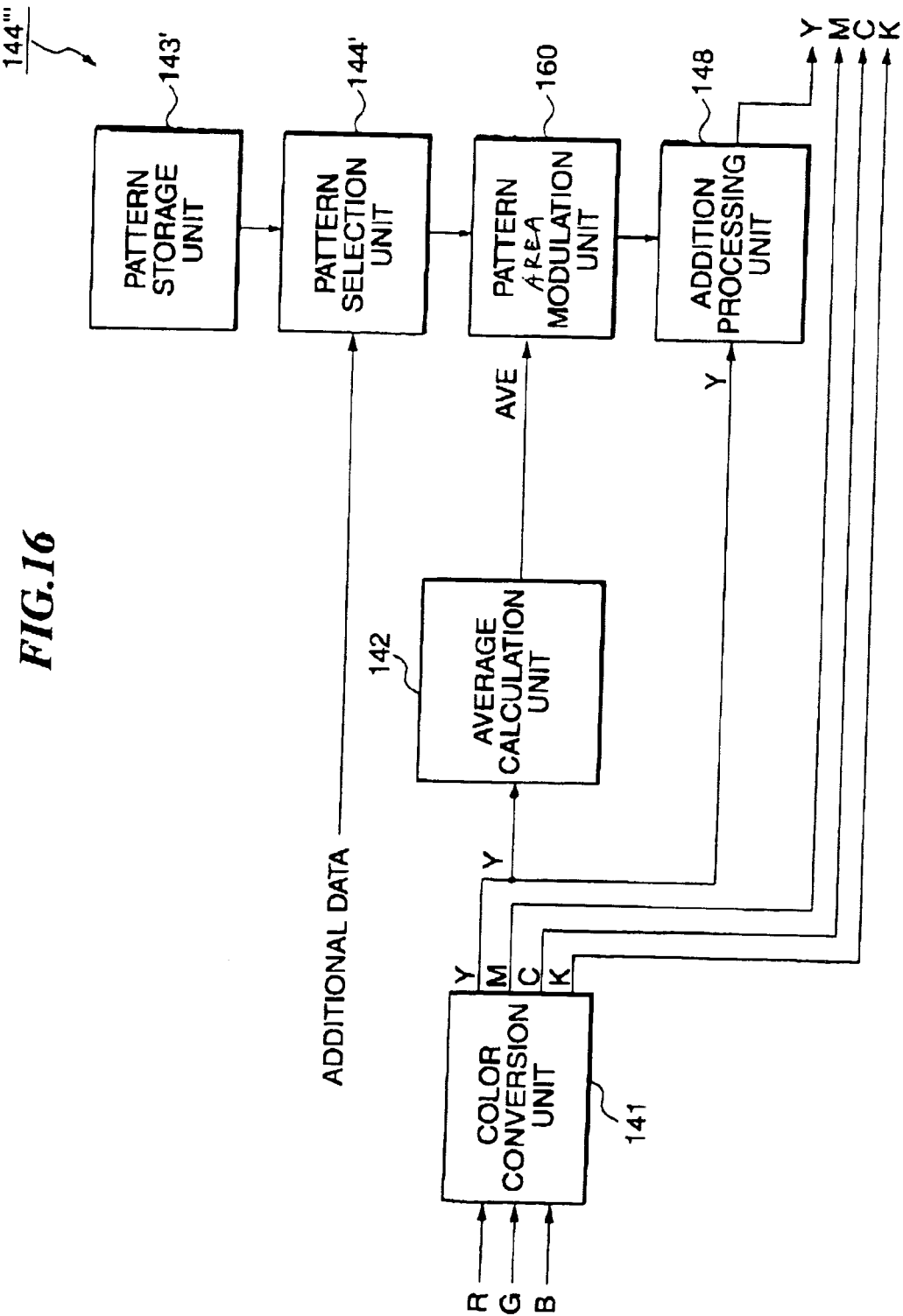
FIG. 16 is a block diagram showing a fourth concrete example of a configuration of the additional data embedding unit.

Next, FIG. 14 shows a third concrete example of a configuration of the additional data embedding unit. An additional data embedding unit 14" according to the third concrete example has: the color conversion unit 141; the average calculation unit 142'; the weight assigning unit 146; a sum density calculation unit 149; an intensity modulation unit 150; a pattern storage unit 143; a pattern selection unit 144; and an addition processing unit 145. Image data read in blocks from the memory 13 (see FIG. 1) is inputted to the additional data embedding unit 14'.

In the additional data embedding unit 14" of the above configuration, the inputted ROB image data is, in the color conversion unit 141, converted from the RGB color space to the YMCK color space of the printer 24 (see FIG. 2). The image data of the YMCK components and the R component is inputted to the average calculation unit 142' and the average of one block of the image data is calculated for each of the YMCKR color components.

The average AVE of the Y component outputted from the average calculation unit 142' is inputted to the pattern selection unit 144, where a pattern is selected according to the average AVE. In this example, a selection is made from the patterns used in the first concrete example shown in FIG. 4. That is, the judgment shown in FIG. 15 is used for such a pattern selection in the pattern selection unit 144. TH1, TH2, and TH3 denote threshold values, and there is a relation of TH1<TH2<TH3. One additional data bit is inputted per block.

When the average AVE is equal to or less than the threshold value TH1, a pattern set including the S00 and S01 patterns having positive coefficient values is selected; when the average AVE is greater than the threshold value TH1 and equal to or less than the threshold value TH2, a pattern set including the S10 and S11 patterns having positive coefficient values is selected; when the average AVE is greater than the threshold value TH2 and equal to or less than the threshold value TH3, a pattern set including the 520 and S21 patterns having negative coefficient values is selected; and when the average AVE is greater than the threshold value TH3, a pattern set including the S30 and S31 patterns having negative coefficient values is selected. Moreover, according to the value of inputted additional data bit, one of two patterns contained in a selected pattern set is finally selected.

If the density value of the yellow component is higher, a pattern having more pixels (larger area) to constitute it is selected. This is for the following reason of property. In a region having a low density, the entire region is likely to appear yellow because of the pattern but the embedded pattern is relatively easily detected, while, in a region having a high density, the embedded pattern is not so conspicuous but is relatively difficult to detect. The area of a pattern is enlarged or reduced by changing the width of the pattern without collapsing its shape.

The average of each of the YMCK color components, calculated by the average calculation unit, is inputted to the weight assigning unit 146, where a weight is assigned to the average of each of the color components. For example, the following weight coefficients are used taking account of whether patterns are conspicuous or are easy to detect, depending on the color of an image region where the patterns are to be embedded.

Y component . . . Weight coefficient (1.0)
M component . . . Weight coefficient (1.0)
C component . . . Weight coefficient (0.5)
K component . . . Weight coefficient (1.5)
R component . . . Weight coefficient (1.5)

That is, in high-density regions such as red (R) and black (K) regions, where detection is difficult, greater weight coefficients are assigned so that pattern amplitudes are modulated larger. On the other hand, in cyan regions, since patterns are conspicuous and easy to detect, smaller weight coefficients are assigned so that pattern amplitudes are modulated smaller.

In the sum density calculation unit 149, the sum of the weighed image data (densities) of the YMCKR color components is found and outputted to the intensity modulation unit 150. The intensity modulation unit 150 performs modulation for pattern coefficient values a and b. Greater modulation quantities are given to the larger sum of the density values calculated in the sum density calculation unit 149. This ensures detection because the density difference between an additional pattern and a background increases as the sum of the density values becomes larger. Also, the smaller the sum density value, the less conspicuous the additional pattern in the background, preventing reduction in the image quality.

The addition processing unit 145 adds the additional data based on the pattern selected in the pattern selection unit 144 to the Y component of the image data, and outputs the result. If the result of the adding becomes equal to or greater than 255, 255 is outputted, and if less than 0, 0 is outputted.

The image data of the Y component added with the additional data, outputted from the addition processing unit 145, is stored in the memory 13 (see FIG. 1) along with the image data of MCK components outputted from the color conversion unit 141. The above processing is repeated for all blocks until processing of one page terminates, in which time the image data stored in the memory 13 is outputted to the printer 24 (see FIG. 2) for printing on paper.

Although, in the above embodiment, slant edge patterns are used as patterns, the present invention is not limited to the slant edge patterns; other patterns, e.g., minute vertical line and horizontal line patterns, may be used so long as they are visually inconspicuous on images printed on paper and easy to detect. Any information, in addition to the information described in the above embodiment, may be embedded.

Next, FIG. 14 shows a fourth concrete example of a configuration of the additional data embedding unit. An additional data embedding unit 14'" according to the fourth concrete example has: the color conversion unit 141; the average calculation unit 142; a pattern storage unit 143'; a pattern selection unit 144'; a pattern area modulation unit 160; and the addition processing unit 148. Image data read in blocks from the memory 13 (see FIG. 1) is inputted to the additional data embedding unit 14'".

In the additional data embedding unit 14'" of the above configuration, the inputted RGB image data is, in the color conversion unit 141, converted from the RGB color space to the YMCK color space of the printer 24 (see FIG. 2). The Y component is inputted to the average calculation unit 142. In the average calculation unit 142, the average of one block of the image data of the Y component is calculated. The calculated average AVE is inputted to the pattern area modulation unit 160.

In parallel with the above operation, one bit of additional data is inputted to the pattern selection unit 144'. The pattern selection unit 144' selects and outputs a corresponding pattern according to the value of the inputted additional data.

Figure 17:
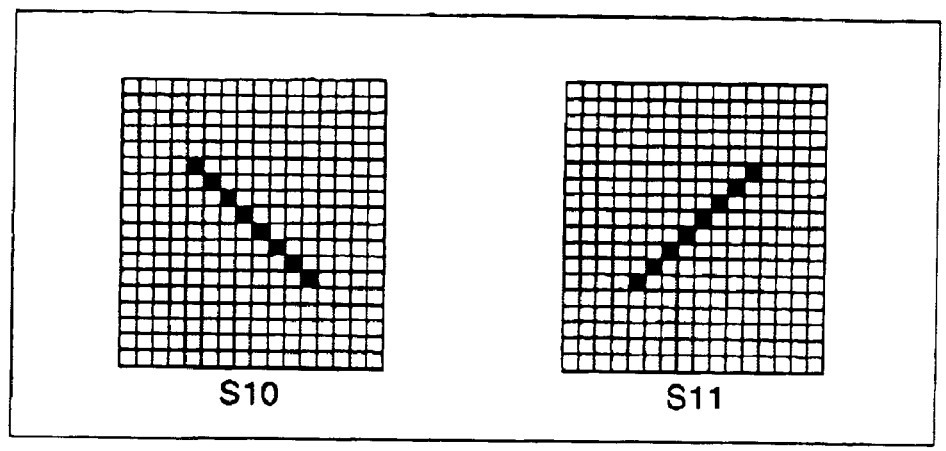
FIG. 17 is a diagram showing an example of patterns stored.

FIG. 17 is a diagram showing an example of patterns stored in the pattern storage unit 143'. The pattern selection unit 144' selects the pattern S10 when the value of the inputted additional data is 0, and selects the pattern S11 when the value of the additional data is 1. The selected pattern is outputted to the pattern area modulation unit 160.

The pattern area modulation unit 160 receives the average AVE of one block of the image data of the Y component, inputted from the average calculation unit 142, and modulates the pattern inputted from the pattern storage unit 143'.

Specifically, the average AVE of one block of the image data of the Y component is compared with the two threshold values TH1 and TH2, and if the average AVE is equal to or less than the threshold value TH1, area modulation is not performed and the inputted pattern is outputted without modification.

If the average AVE of one block of the image data of the Y component is greater than the threshold value TH1 and equal to or less than the threshold value TH2, a new pattern is created by shifting the inputted pattern one pixel to the right and area modulation is performed in a manner that makes the pattern wider by one pixel in a horizontal direction by ORing it with the original pattern, and then the pattern is outputted.

If the average AVE of one block of the image data of the Y component is greater than the threshold value TH2, a new pattern is created by shifting the inputted pattern one pixel to the right and area modulation is performed in a manner that makes the pattern wider by two pixels in a horizontal direction by twice repeating ORing it with the original pattern, and then the pattern is outputted. There is a relation of TH1<TH2 between the two threshold values TH1 and TH2. One additional data bit is inputted per block.

The addition-subtraction processing unit 148 adds or subtracts the additional data based on the pattern selected in the pattern selection unit 144 to or from the Y component of the image data, and outputs the result. That is, if the value of the Y component is less than 128, the pattern coefficient value a is added (positive amplitude), and if equal to or greater than 128, the pattern coefficient value a is subtracted (negative amplitude). No operation is performed for pixels corresponding to white portions. If the result of the adding or subtracting becomes equal to or greater than 255, 255 is outputted, and if less than 0, 0 is outputted.

In this way, by superimposing a pattern (additional data) modulated in area according to the averages AVE of one block of the Y component on the image data of the Y component, in an image printed out by the printer 24, even if the density is high, the pattern embedded in the Y component can be detected without fail, while, if the density is low, reduction in the image quality can be prevented by not making the pattern excessively conspicuous.

The image data of the Y component added with the additional data, outputted from the addition-subtraction processing unit 145, is stored in the memory 13 (see FIG. 1) along with the image data of MCK components outputted from the color conversion unit 141. The above processing is repeated for all blocks until processing of one page terminates, in which time the image data stored in the memory 13 is outputted to the printer 24 (see FIG. 2) for printing on paper.

Although, in the above embodiment, the detection and embedding of additional data is performed in an independent image processing apparatus 10, the present invention is not limited to the configuration. Processing may be performed by software within a personal computer, or the image processing apparatus may be integrally incorporated within a printer.

As has been described above, according to the present invention, in an image processing apparatus that superimposes additional data representing additional information on image data, since the density values of predetermined color components of the image data are detected and additional data different in pattern area according to the density values is superimposed on the image data, the pattern area of additional data changes according to the density of the image data, and additional data that is visually inconspicuous and can be accurately read during detection can be superimposed.

In an image processing apparatus that superimposes additional data representing additional information on image data, since density values assigned different weights for different color components of the image data are detected and additional data of pattern sets different according to the density values is decided, a pattern set can be decided taking account of the conspicuousness of each color component of the image data and additional data that is visually inconspicuous and can be accurately read during detection can be superimposed.

What is claimed is:

1. An image processing apparatus, comprising:
    a density value detection part that detects a density value of a predetermined color component of image data to which an additional data is to be added;
    a pattern decision part that decides a pattern having an area corresponding to the density value detected by the density value detection part and having a shape corresponding to the additional data to be added to the image data; and
    a pattern superimposing part that superimposes the pattern decided by the pattern decision part on the image data.

2. The image processing apparatus according to claim 1, further comprising a pattern storage part that stores plural patterns having different shapes and areas,
    wherein the pattern decision part selects a pattern from the patterns stored in the pattern storage part.

3. The image processing apparatus according to claim 1, further comprising an area changing part that changes the area of a pattern,
    wherein the area of a pattern having a shape corresponding to the value of additional data is changed by the area changing part when the pattern decision part makes a decision.

4. The image processing apparatus according to claim 1, wherein the pattern decision part decides a wider pattern is to be added when the density value detection part detects that the predetermined color component has a higher density value than a threshold value.

5. The image processing apparatus according to claim 1, wherein the density value detection part detects a density value of a yellow component of the image data.

6. The image processing apparatus according to claim 1, wherein the density value detection part detects a sum of weighed density values of the respective color components of the image data.

7. The image processing apparatus according to claim 6, wherein the pattern superimposing part modulates amplitude of the pattern corresponding to the value of additional data according to the sum of weighed density values of the color components of the image data before superimposing the pattern.

8. The image processing apparatus according to claim 6, wherein, of the color components, a cyan color is assigned a lower weight than other color components to find the sum of the weighed density values.

9. The image processing apparatus according to claim 6, wherein, of the color components, a black or red color is assigned a higher weight than other color components to find the sum of the weighed density values.

10. The image processing apparatus according to claim 1, wherein the pattern decision part decides a larger pattern to be added when the density value detection part detects that the predetermined color component has a higher density value than a threshold value.

11. The image processing apparatus according to claim 1, wherein the additional data is a network address to indicate the location where the image data is stored.

12. The image processing apparatus according to claim 1, wherein the additional data is an ID to identify the copyright holder of the image data.

13. An image processing method, comprising:
    detecting, by a density value determining part, a density value of a predetermined color component of image data to which an additional data is to be added;
    deciding, by a pattern decision part, a pattern having an area corresponding to the density value detected by the density value detection part and having a shape corresponding to the additional data to be added to the image data; and
    superimposing, by a pattern superimposing part, the decided pattern on the image data.

14. The image processing method according to claim 13, further comprising:

storing plural patterns having different shapes and areas in which an appropriate pattern is selected amongst the plural patterns.

15. The image processing method according to claim 13, further comprising:

changing the area of a pattern having a shape corresponding to the value of additional data when the pattern decision part makes a decision.

16. The image processing method according to claim 13, further comprising;

deciding a wider pattern to be added when the density value detection part detects that the predetermined color component has a higher density value than a threshold value.

17. The image processing method according to claim 13, further comprising;

detecting a density value of a yellow component of the image data.

18. The image processing method according to claim 13, further comprising;

detecting a sum of weighed density values of the respective color components of the image data.

19. The image processing method according to claim 18, further comprising;

modulating amplitude of the pattern corresponding to the value of additional data prior to superimposing the pattern according to the sum of weighed density values of the color components of the image data.

20. The image processing method according to claim 18, further comprising;

assigning a cyan color with a lower weight than other color components, in order to find the sum of the weighed density values.

21. The image processing method according to claim 18, further comprising;

assigning black or red color with a higher weight than other color components, in order to find the sum of the weighed density values.

22. The image processing method according to claim 13, further comprising;

deciding a larger pattern to be added when the density value detection part detects that the predetermined color component has a higher density value than a threshold value.

23. The image processing method according to claim 13, further comprising;

using a network address as an additional data to indicate the location where the image data is stored.

24. The image processing method according to claim 13, further comprising;

using an ID as an additional data to identify the copyright holder of the image data.

\* \* \* \* \*